United States Patent [19]
Kinoshita et al.

[11] Patent Number: 4,938,140
[45] Date of Patent: Jul. 3, 1990

[54] DECELERATION SENSOR

[75] Inventors: Yoshihiko Kinoshita; Kazuhiro Kishimoto; Hiroshi Tabata, all of Saitama, Japan

[73] Assignee: Honda Giken Kogyo Kabushiki Kaisha, Tokyo, Japan

[21] Appl. No.: 413,663

[22] Filed: Sep. 28, 1989

[30] Foreign Application Priority Data

Sep. 29, 1988 [JP] Japan .................................. 63-245788
Oct. 19, 1988 [JP] Japan .................... 63-136505[U]

[51] Int. Cl.$^5$ .......................... F42C 1/04; B60R 21/08; H01H 35/14
[52] U.S. Cl. .................................. 102/274; 200/61.53
[58] Field of Search ...................... 200/61.53, 61.45 R, 200/61.48, 734; 60/636; 180/2 R; 102/252, 274

[56] References Cited

U.S. PATENT DOCUMENTS

| | | | |
|---|---|---|---|
| 2,941,472 | 6/1960 | Lee et al. | 102/274 |
| 3,226,504 | 12/1965 | Gallistel et al. | 200/61.53 |
| 3,974,350 | 8/1976 | Breed | 200/61.53 |
| 4,204,703 | 5/1980 | Okada | 200/61.53 |
| 4,580,810 | 4/1986 | Thuen | 280/734 |
| 4,864,086 | 9/1989 | Akiyama et al. | 200/61.53 |

*Primary Examiner*—David H. Brown
*Attorney, Agent, or Firm*—Armstrong, Nikaido, Marmelstein, Kubovcik & Murray

[57] ABSTRACT

A deceleration sensor, comprising a pair of U-shaped pendulums pivotally suspended from upper parts of a casing at their upper ends by way of pivot shafts extending in parallel with each other, one of the pendulums being received by the other in such a manner that they are permitted to pivot around their respective pivot shafts without interfering with each other, a pair of biasing springs for opposing movement of the pendulums against their inertia forces, a firing pin slidably received in the guide bore, a drive spring urging the firing pin toward a fuse which is intended to be activated by the deceleration sensor, a swing arm which is pivotally attached to the sensor casing at its one end and engaged by one of the pendulums at its other end; and a trigger arm which is pivotally attached to a middle part of the swing arm so as to be able to swing in a same plane as the swing arm, and is engaged by the other of the pendulumns at its one end and engages the firing pin against the spring force of the drive spring at its other end. Thus, the firing pin can be activated when at least one of the pendulums is activated by its inertia so as to disengage the swing arm or the trigger arm therefrom, and a high reliability can be achieved with a simple and compact structure.

8 Claims, 4 Drawing Sheets

DECELERATION SENSOR

TECHNICAL FIELD

The present invention relates to a deceleration sensor for a vehicle suitable for supplying an activation signal to a vehicle occupant protection system for minimizing the forward movement of a vehicle occupant in case of a vehicle crash or the like, such as a seat belt tightening device, an air bag device and so on.

BACKGROUND OF THE INVENTION

A vehicle seat is provided with a seat belt device for restraining the vehicle occupant to prevent the vehicle occupant from being thrown forward in case of a vehicle crash. Since such a seat belt device is desired not to obstruct the normal movement of the occupant and to be tightened only when a deceleration in excess of a prescribed value has been applied to the vehicle, there have been proposed a number of seat belt tightening devices which detect an impact of a vehicle crash through a displacement of an elastically supported pendulum caused by an inertia force acting thereon, ignite a propellant cartridge, and wind the seat belt by making use of the energy thus produced, for instance in copending U.S Pat. application Ser. No. 07/132,257, filed Dec. 14, 1987, now U.S. Pat. No. 4,864,086. U.S. Pat. No. 4,418,503 discloses a device for reducing an impact upon a vehicle occupant by fitting an air bag which can rapidly expand upon occurrence of a vehicle crash, in a steering wheel.

It has been customary to use those devices making use of the movement of a weight by its inertia as a crash detecting device for activating such a vehicle occupant protection device (refer to U.S. Pat. No. 4,580,810). Such a device must be capable of being activated without fail when subjected to a deceleration in excess of a prescribed level, but must not be inadvertently activated erroneously. On the other hand, since such a crash detecting device is only activated under special circumstances and cannot be tested in any simple fashion, an extremely high operation reliability is required.

BRIEF SUMMARY OF THE INVENTION

In view of such circumstances, a primary object of the present invention is to provide a deceleration sensor for a vehicle which is simple and reliable.

A second object of the present invention is to provide a deceleration sensor which is compact and reliable.

These and other objects of the present invention can be accomplished by providing a deceleration sensor, comprising: a sensor casing having a middle part defining a guide bore extending in a certain direction; a pair of pendulums pivotally suspended from upper parts of the casing at their upper ends in individually pivotable manner; a pair of biasing spring means for opposing movement of the pendulums against their inertia forces; a firing pin slidably received in the guide bore; drive spring means urging the firing pin toward fuse means which is intended to be activated by the deceleration sensor; a swing arm which is pivotally attached to the sensor casing at its one end and engaged by one of the pendulums at its other end; and a trigger arm which is pivotally attached to a middle part of the swing arm so as to be able to swing in a same plane as the swing arm, and is engaged by the other of the pendulums at its one end and engages the firing pin against the spring force of the drive spring means at its other end; whereby the trigger arm keeps the firing pin at its non-active state against the spring force of the drive spring means when neither one of the pendulums is displaced by more than a certain threshold value and releases the firing pin into its active state under the spring force of the drive spring means when at least one of the pendulums is displaced by more than the threshold value.

Thus, when one of the pendulums is displaced by its own inertia upon occurrence of a vehicle crash, the swing arm is disengaged from this pendulum and the trigger arm is displaced so as to activate the firing pin. When the other pendulum is disengaged from the one end of the trigger arm, the trigger arm is similarly displaced so as to activate the firing pin. In short, when at least one of the pendulums is disengaged from the trigger arm of the swing arm, the firing pin is activated. Thus, the possibility of the occurrence of a failure can be effectively reduced, and its operation reliability can be much improved.

According to a preferred embodiment of the present invention, the pendulums consist of a pair of U-shaped pendulums pivotally suspended from upper parts of the casing at their upper ends by way of pivot shafts extending in parallel with each other, one of the pendulums being received by the other in such a manner that they are permitted to pivot around their respective pivot shafts without interfering with each other. Thus, the pendulums are prevented from becoming askew or the pivoted parts of the pendulums are not subjected to any excessive load. Further, space requirements are minimized for given masses of the pendulums. Preferably, the middle part of the sensor casing is received in an inner space defined by the U-shaped pendulums to reduce space requirements even further.

In order to ensure secure engagement under normal condition and smooth disengagement upon detection of a high deceleration, the one end of the swing arm rests upon a rear end of a bottom portion of one of the pendulums, and the one end of the trigger arm rests upon a rear end of a bottom portion of the other pendulum, the rear ends of the bottom portions of the pendulums being defined by planes extending in parallel with tangential directions of the movements of the pendulums from their rest positions.

If the rear end of the bottom portion of at least one of the pendulums is further away from the associated pivot shaft than the center of gravity of the associated pendulum, the displacement of the center of mass is magnified at the engagement portion so as to improve the smoothness of disengagement from the swing arm or the trigger arm.

To prevent any askew movement of the swing arm and the trigger arm and to achieve a compact design of the deceleration sensor, it is preferred that the swing arm is located centrally of side walls of the U-shaped pendulums, and the trigger arm is substantially U-shaped with its middle part pivotally supported by the middle part of the swing arm, its open ends projecting into the guide bore and engaging the firing pin and its closed end resting upon the rear end of the bottom portion of the other pendulum.

BRIEF DESCRIPTION OF THE DRAWINGS

Now the present invention is described in the following in terms of a specific embodiment with reference to the appended drawings, in which.

DETAILED DESCRIPTION OF THE PREFERRED EMBODIMENT

Figure 1:
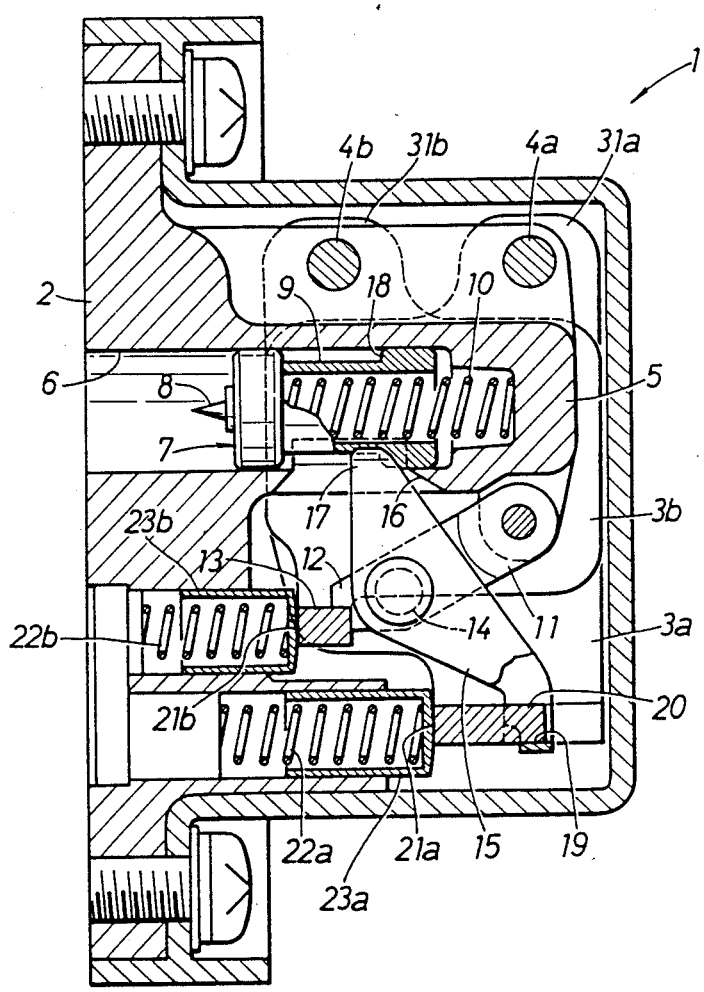
FIG. 1 is a partly broken away side view of an embodiment of the present invention.
Figure 2:
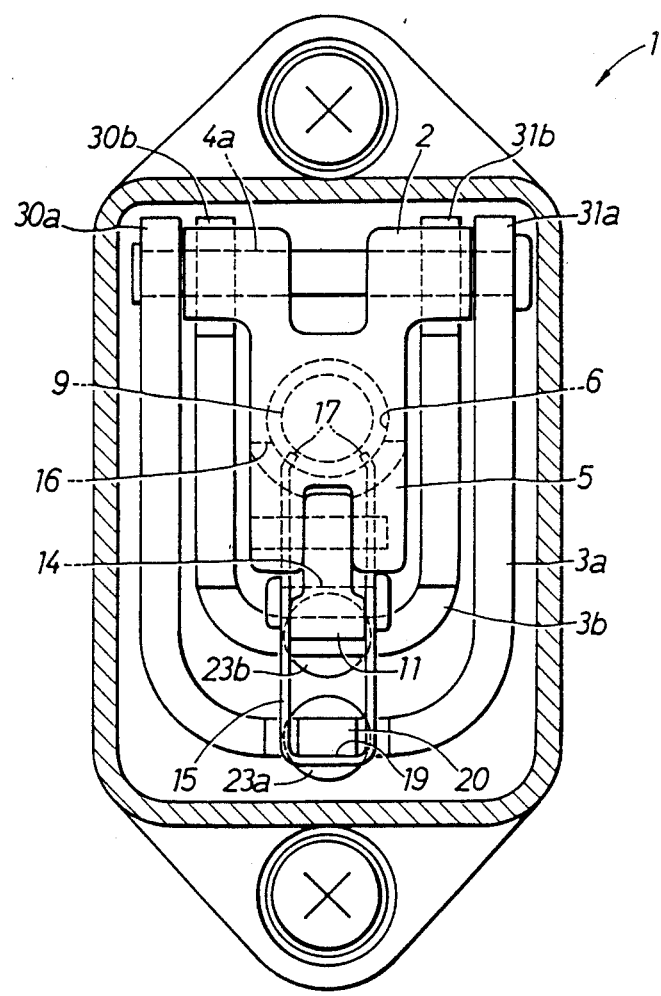
FIG. 2 is a partly broken away rear view of the same.
Figure 3:
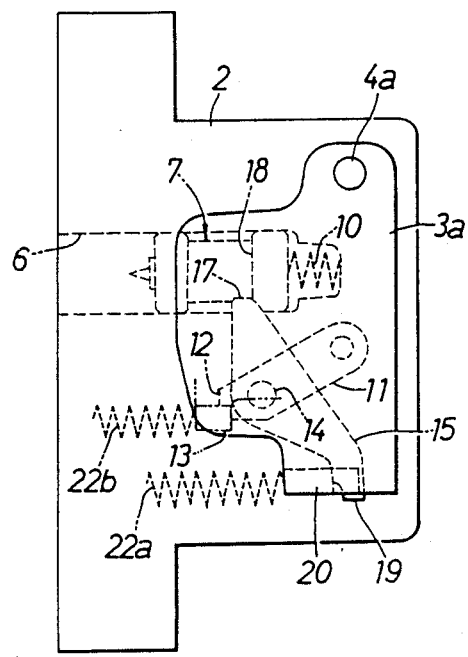
FIGS. 3 through 6 are schematic views illustrating the operation of the present embodiment.

FIGS. 1 and 2 show an embodiment of the deceleration sensor for a vehicle according to the present invention. A pair of pendulums 3a and 3b are suspended from upper side portions of a sensor casing 2 of this deceleration sensor in a pivotable manner at their upper ends. Each of the pendulums 3a and 3b is U-shaped with its open upper ends directed upward and its upper side ends 30a and 31a or 30b and 31b pivotally supported by an associated support shaft 4a or 4b. One of the pendulums is received in the other so as to be able to pivot individually without interfering with each other.

A middle part 5 of the sensor body 2, which extends through the interior of the inner space defined by the U-shaped pendulums 3a and 3b, is provided with a cylindrical guide bore 6 having an open front end and extending along a tangential direction of the trajectories of the movement of the pendulums 3a and 3b as they pivot from their rest positions. This guide bore 6 receives a firing pin 7 for igniting a fuse for a propellant cartridge serving as an actuator for a vehicle occupant restraint system.

The firing pin 7 comprises a pointed front end 8, and a cylindrical plunger portion 9 having an open rear end and slidably received in the guide bore 6, and is normally urged toward the open end of the guide bore 6 under the elastic action of a compression coil spring 10 interposed between the bottoms of the plunger portion 9 and the guide bore 6.

A rear portion of the middle part 5 of the sensor casing 2 pivotally supports a swing arm 11 so as to permit its downward swinging motion. A free end portion 12 of the swing arm 11 is restricted from moving downward by engagement with a bottom portion 13 of the inner pendulum 3b at its non-active position located exactly under its support shaft 4b.

A middle part of the swing arm 11 near its free end pivotally supports a trigger arm 15 so as to permit a swinging movement of the trigger arm 15 in the manner of a see-saw by means of a support shaft 14. This trigger arm 15 is shaped like a crank as seen from a side (FIG. 1) and letter U as seen from front (FIG. 2), with its open upper ends 17 projecting into the guide bore 6 from a notch 16 provided in a lower portion of the middle part 5 of the sensor casing 2 so as to engage an annular shoulder 18 provided in the plunger portion 9 of the firing pin 7 with its open ends 17.

From a bottom portion of the U-shaped outer pendulum 3a projects a projection 20 so as to be engaged with the bottom surface of a U-shaped end 19 of the trigger arm 15. The free end portion 12 of the swing arm 11 is engaged with the bottom portion 13 of the inner pendulum 3b, the U-shaped end portion 19 of the trigger arm 15 is engaged with the projection 20 of the outer pendulum 3a, and the open ends 17 of the trigger arm 15 are engaged with the annular shoulder 18 of the firing pin 7 so that the firing pin 7 may be kept stationary against the biasing force of the coil spring 10.

A part of the sensor casing 2 opposing the front end surfaces 21a and 21b of the bottom portions of the pendulums 3a and 3b accommodates a pair of biasing springs 22a and 22b so as be located centrally of the pendulums 3a and 3b and in parallel with the axial line of the guide bore 6. These biasing springs 22a and 22b abut the front end surfaces 21a and 21b of the bottom portions of the pendulums 3a and 3b by way of guide caps 23a and 23b so as to normally urge the pendulums 3a and 3b rearward thereby.

In this way, the engagement between the projection 20 of the outer pendulum 3a and the U-shaped end 19 of the trigger arm 15, and the engagement between the bottom portion 13 of the inner pendulum 3b and the free end portion 12 of the swing arm 11 are normally maintained.

Now the operation of the above described embodiment of the present invention is described in the following with reference to FIGS. 3 through 6.

Under normal running condition of the vehicle, the inertia moments of the two pendulums 3a and 3b are overcome by the elastic forces of the respective biasing springs 22a and 22b, and the support shaft 14 of the trigger arm 15 is kept at its position by engagement between the swing arm 11 and the inner pendulum 3b while the angular position of the trigger arm 15 is maintained by engagement between the U-shaped end 19 of the trigger arm 15 and projection 20 of the outer pendulum 3a. The trigger arm 15 is thus prevented from either dropping or rotating, and the firing pin 7 is prevented from moving by the open ends 17 of the trigger arm 15.

Figure 4:
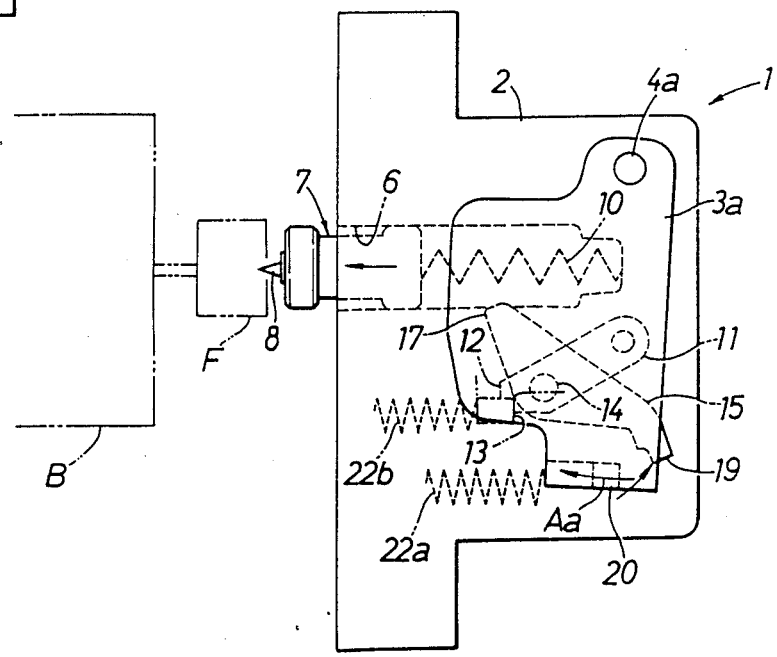
Figure 5:
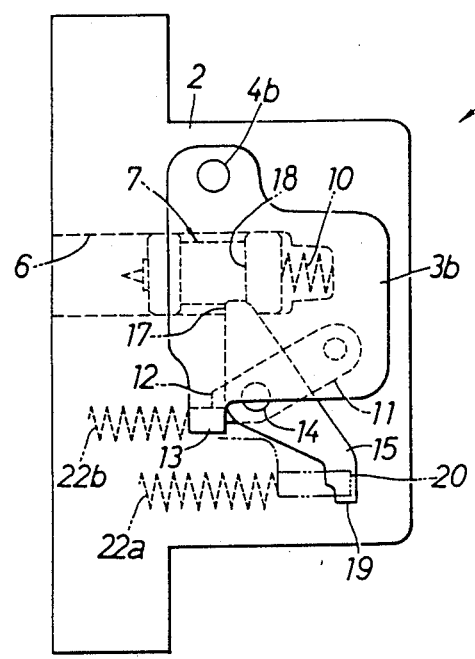
Figure 6:
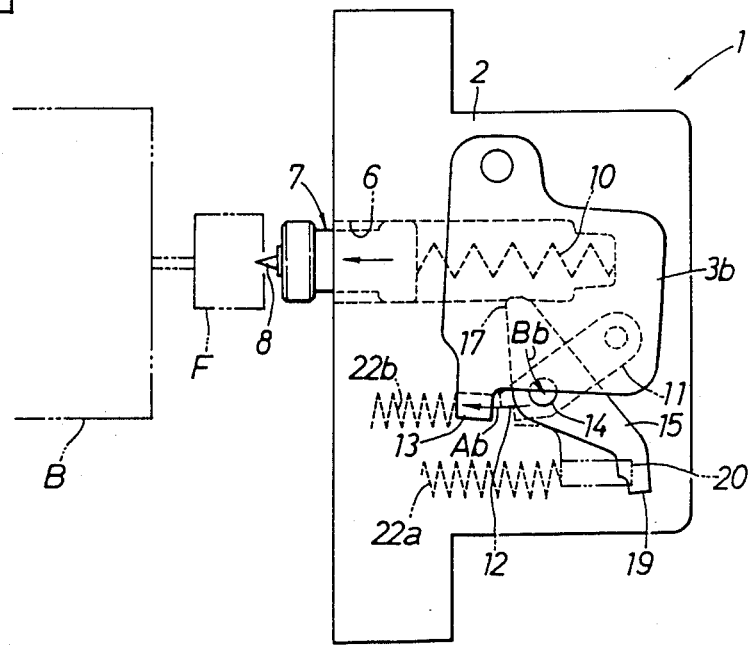

When a vehicle crash has occurred and deceleration in excess of a prescribed value has acted upon the vehicle in the direction of its travel, the inertia forces of the pendulums 3a and 3b overcome the biasing forces of the biasing springs 22a and 22b and the pendulums 3a and 3b swing forward with their lower ends first (as indicated by the arrows Aa and Ab in FIGS. 4 and 6. As a result, the U-shaped end 19 of the trigger arm 15 is disengaged from the projection 20 of the outer pendulum 3a, and the restraint by the open ends 17 of the trigger arm 15 acting upon the firing pin 7 is removed, so that the firing pin 7 pushes away the open ends 17 of the trigger arm 15 and is propelled toward the fuse F.

When the free end portion 12 of the swing arm 11 is disengaged from the bottom portion 13 of the inner pendulum 3b, the swing arm 11 swings downward (as indicated by the arrow Bb in FIG. 6). Then, the free end portion 12 of the swing arm 11 moves downward along with the support shaft 14 and the trigger arm 15, and the restraint by the open ends 17 of the trigger arm 15 upon the firing pin 7 is similarly removed with the result that the firing pin 7 is propelled forward (FIG. 6).

When the pointed end 8 of the firing pin 7 strikes upon the fuse F, the propellant cartridge B is ignited, and the resulting explosive pressure build-up drives a seat tightening device or the like which is not shown in the drawings.

Such a deceleration sensor for detecting the occurrence of a vehicle crash requires an extremely high operation reliability. Hence, the present invention makes use of a pair of pendulums 3a and 3b serving as the sensor weights, and are engaged by trigger means in two different ways. By doing so, should the engagement by one of the pendulums 3a and 3b fail, for instance by the jamming of the U-shaped end 19 of the trigger arm 15 and the projection 20 of the outer pendulum 3b, the propulsion of the trigger 7 would still be possible by operation of the other of the pendulums.

The operation of the embodiment was described in the above for each individual pendulum, but it is obvious that the firing pin 7 will be propelled in a similar fashion even when the two pendulums 3a and 3b are activated at the same time.

The forces of engagement between the pendulum 3a and the swing arm 11 and between the pendulum 3b and the trigger arm 15 are affected by the areas of contact therebetween. Hence, in order to eliminate the possibility of causing any variations of the deceleration sensors of this kind during the manufacturing process, the dimensional precision of such contact areas is desired to be increased as much as possible. Therefore, according to the above described embodiment, the distances between the pivot points and the associated engagement portions are selected to be larger than the distances between the pivot points of the pendulums 3a and 3b and their centers of gravity. By doing so, the displacement of the centers of the gravity of the pendulums due to the forces of inertia are magnified at their engagement portions and their dimensions can be increased. Thus, the overall dimensional tolerance is favorably increased.

On the other hand, in order to ensure a stable sensitivity property, it is necessary for each of the engagement portions between the pendulum 3a and the swing arm 11 and between the pendulum 3b and the trigger arm 15 to positively return to their original states when inertia forces of less than the level required for releasing the swing arm 11 or the trigger arm 15 are applied to the pendulums. To this end, the engagement portions between the pendulum 3a and the swing arm 11 and between the pendulum 3b and the trigger arm 15 are located substantially exactly under the support shafts 4a and 4b of the associated pendulums 3a and 3b. At the same time, each of the pendulums 3a and 3b is supported at two points located along a line perpendicular to the movement of the pendulum and the associated biasing spring 22a or 22b is located on the plumb line drawn from the center of the support points so that the stability of the movement of the pendulums 3a and 3b may be improved and the elastic forces of the biasing springs 3a and 3b may be accurately applied to the associated pendulums 3a and 3b. Therefore, even when the pendulums 3a and 3b are slightly displaced, they can safely and smoothly return to their original positions without involving any askew movements thereof.

Thus, according to the present invention, potential factors for causing a failure to the deceleration sensor is effectively eliminated, and the possibility of the occurrence of a failure upon occurrence of a vehicle crash can be much minimized. Therefore, the present invention can offer a significant advantage in improving the reliability of a deceleration sensor.

What we claim is:

1. A deceleration sensor, comprising:
    a sensor casing having a middle part defining a guide bore extending in a certain direction;
    a pair of pendulums pivotally suspended from upper parts of said casing at their upper ends in individually pivotable manner;
    a pair of biasing spring means for opposing movement of said pendulums against their inertia forces;
    a firing pin slidably received in said guide bore;
    drive spring means urging said firing pin toward fuse means which is intended to be activated by said deceleration sensor;
    a swing arm which is pivotally attached to said sensor casing at its one end and engaged by one of said pendulums at its other end; and
    a trigger arm which is pivotally attached to a middle part of said swing arm so as to be able to swing in a same plane as said swing arm, and is engaged by the other of said pendulums at its one end and engages said firing pin against the spring force of said drive spring means at its other end;
    whereby said trigger arm keeps said firing pin at its non-active state against the spring force of said drive spring means when neither one of said pendulums is displaced by more than a certain threshold value and releases said firing pin into its active state under the spring force of said drive spring means when at least one of said pendulums is displaced by more than the threshold value.

2. A deceleration sensor according to claim 1, wherein said biasing springs abut front ends of said bottom portions of said pendulums.

3. A deceleration sensor according to claim 1, wherein said pendulums consist of a pair of U-shaped pendulums pivotally suspended from upper parts of said casing at their upper ends by way of pivot shafts extending in parallel with each other, one of said pendulums being received by the other in such a manner that they are permitted to pivot around their respective pivot shafts without interfering with each other.

4. A deceleration sensor according to claim 3, said middle part is received in an inner space defined by said U-shaped pendulums.

5. A deceleration sensor according to claim 3, wherein said swing arm is located centrally of side walls of said U-shaped pendulums, and said trigger arm is substantially U-shaped with its middle part pivotally supported by said middle part of said swing arm, its open ends projecting into said guide bore and engaging said firing pin and its closed end resting upon said rear end of said bottom portion of said other pendulum.

6. A deceleration sensor according to claim 3, wherein said one end of said swing arm rests upon a rear end of a bottom portion of said one of said pendulums, and said one end of said trigger arm rests upon a rear end of a bottom portion of said other pendulum, said rear ends of said bottom portions of said pendulums being defined by planes extending in parallel with tangential directions of the movement of said pendulums from their rest positions.

7. A deceleration sensor according to claim 6, wherein said rear ends of said bottom portions of said pendulums are located substantially exactly under the associated pivot shafts of said pendulums, respectively.

8. A deceleration sensor according to claim 6, wherein said rear end of said bottom portion of at least one of said pendulums is further away from the associated pivot shaft than the center of gravity of the associated pendulum.

* * * * *